(12) United States Patent
Iaconelli et al.

(10) Patent No.: US 8,716,198 B2
(45) Date of Patent: May 6, 2014

(54) PREVENTION AND REMEDIATION OF WATER AND CONDENSATE BLOCKS IN WELLS

(75) Inventors: Cheryl Lynn Iaconelli, Woolwich, NJ (US); Gerald Oronde Brown, Wilmington, DE (US); Christopher James Martin, Wilmington, DE (US); Erick J. Acosta, Sugar Land, TX (US)

(73) Assignee: E I du Pont de Nemours and Company, Wilmington, DE (US)

( * ) Notice: Subject to any disclaimer, the term of this patent is extended or adjusted under 35 U.S.C. 154(b) by 75 days.

(21) Appl. No.: 13/051,417

(22) Filed: Mar. 18, 2011

(65) Prior Publication Data
US 2012/0071372 A1 Mar. 22, 2012

Related U.S. Application Data

(63) Continuation-in-part of application No. 12/437,572, filed on May 8, 2009, now abandoned.

(60) Provisional application No. 61/127,029, filed on May 9, 2008.

(51) Int. Cl.
| | |
|---|---|
| *C09K 8/60* | (2006.01) |
| *C09K 8/52* | (2006.01) |
| *E21B 43/16* | (2006.01) |
| *E21B 21/00* | (2006.01) |

(52) U.S. Cl.
USPC ........... 507/205; 507/90; 166/305.1; 166/312

(58) Field of Classification Search
USPC .......................... 507/90, 205; 166/305.1, 312
See application file for complete search history.

(56) References Cited

U.S. PATENT DOCUMENTS

| | | | |
|---|---|---|---|
| 4,147,851 A * | 4/1979 | Raynolds | 526/245 |
| 4,565,639 A | 1/1986 | Penny et al. | |
| 4,828,031 A | 5/1989 | Davis | |
| 4,842,065 A | 6/1989 | McClure | |
| 5,919,527 A | 7/1999 | Fitzgerald et al. | |
| 6,120,892 A | 9/2000 | Fitzgerald | |
| 6,326,447 B1 | 12/2001 | Fitzgerald | |
| 6,579,572 B2 | 6/2003 | Espin et al. | |
| 6,689,854 B2 | 2/2004 | Fan et al. | |
| 7,256,160 B2 | 8/2007 | Crews | |
| 2003/0166472 A1 | 9/2003 | Pursley et al. | |
| 2005/0065036 A1 | 3/2005 | Treybig et al. | |
| 2006/0189488 A1 | 8/2006 | Treybig et al. | |
| 2006/0260808 A1 | 11/2006 | Weaver et al. | |
| 2006/0260813 A1 | 11/2006 | Welton et al. | |
| 2007/0029085 A1 | 2/2007 | Panga et al. | |

FOREIGN PATENT DOCUMENTS

| | | |
|---|---|---|
| CN | 1441147 A | 9/2003 |
| CN | 1454921 A | 11/2003 |
| CN | 1469021 A | 1/2004 |
| CN | 1539860 A | 10/2004 |
| CN | 1614129 A | 2/2005 |
| CN | 1614128 A | 5/2005 |
| CN | 1727566 A | 2/2006 |
| EP | 151833 A1 | 8/1985 |
| EP | 151833 B1 | 10/1987 |
| GB | 2127462 A | 10/2010 |
| WO | 03083259 A2 | 10/2003 |
| WO | 2005028589 A1 | 3/2005 |
| WO | 2005094552 A2 | 10/2005 |

OTHER PUBLICATIONS

Saigo et al., "Nonsticking Property of Fluoropolymers and its Application," Toso to Toryo, 1982, 55-64, 347, Tokyo, Japan.
Al-Anazi, et al., "Laboratory Measurements of Condensate Blocking and Treatment for Both Low and High Permeability Rocks," SPE Annual Technical Conference and Exhibition, Sep. 29-Oct. 2, San Antonio, Texas Copyright, 2002 Society of Petroleum Engineers Inc.
Du, et al. "Use of Solvents to Improve the Productivity of Gas Condensate Wells," SPE Annual Technical Conference and Exhibition, Oct. 1-4, Dallas, Texas, 2000, Society of Petroleum Engineers Inc.
Kamath, et al. "Laboratory Based Evaluation of Gas Well Deliverability Loss Due to Waterblocking, " SPE Annual Technical Conference and Exhibition, Oct. 1-4, Dallas, Texas, 2000, Society of Petroleum Engineers Inc.
Luo, et al. "Experimental Investigation into Revaporization of Retrograde Condensate by Lean Gas Injection," SPE Asia Pacific Oil and Gas Conference and Exhibition, Apr. 17-19, Jakarta, Indonesia, 2001, Society of Petroleum Engineers Inc.
Al-Anazi, "A Successful Methanol Treatment in a Gas/condensate Reservoir: Field Application," Production & Facilities, vol. 20, No. 1, Feb. pp. 60-69, 2005, Society of Petroleum Engineers.
Mahadevan, et al., "Factors Affecting Cleanup of Water Blocks: A Laboratory Investigation," SPE Journal vol. 10, No. 3, Sep. 2005, pp. 238-246 Society of Petroleum Engineers.
Jamaluddin, et al., "Experimental and Theoretical Assessment of Using Propane to Remediate Liquid Buildup in Condensate Reservoirs," SPE Annual Technical Conference and Exhibition, Sep. 30-Oct. 3, New Orleans, Louisiana, Copyright 2001, Society of Petroleum Engineers Inc.
Li, et al., "Experimental Study of Wettability Alteration to Preferential Gas-Wetting in Porous Media and its Effects," SPE Reservoir Evaluation & Engineering, vol. 3, No. 2, Apr. 2000, Society of Petroleum Engineers, pp. 139-149.
Tang, et al., "Relative Permeability Modification in Gas/Liquid Systems Through Wettability Alteration to Intermediate Gas Wetting," SPE Reservoir Evaluation & Engineering, vol. 5, No. 6, Dec. 2002, Society of Petroleum Engineers.
U.S. Appl. No. 12/437,572, filed May 8, 2009.
U.S. Appl. No. 61/127,029, filed May 9, 2008.

* cited by examiner

*Primary Examiner* — Aiqun Li

(57) ABSTRACT

The present invention relates to a method of removing and preventing water and condensate blocks in wells by contacting a subterranean formation with a composition comprising a low molecular weight fluorinated copolymer having perfluoro alkyl moieties which are no longer than $C_6$. A fluorinated copolymer of low molecular weight of about 50,000 g/mol and a method of preparing the same are also disclosed.

10 Claims, No Drawings

PREVENTION AND REMEDIATION OF WATER AND CONDENSATE BLOCKS IN WELLS

This application is a continuation-in-part application of Ser. No. 12/437,572 filed May 8, 2009, entitled "Prevention and Remediation of Water and Condensate Blocks in Wells" which claims the benefit of the filing date of Provisional Application Ser. No. 61/127,029, filed May 9, 2008, entitled "Prevention and Remediation of Water and Condensate Blocks in Wells". The entire disclosures are hereby incorporated by reference into the present disclosure.

FIELD OF THE INVENTION

This invention relates to a method for prevention and remediation of water block and condensate block in oil and/or gas producing subterranean formations. In particular, the invention relates to contacting such subterranean formations with a composition comprising a low molecular weight fluorinated copolymer thereby modifying the wettability of the rock within the subterranean formation and removing and preventing water block and condensate block therein.

BACKGROUND OF THE INVENTION

Typically, hydrocarbon extraction involves drilling a wellbore into an oil and/or gas containing subterranean formation. Hydrocarbon extraction is facilitated by a vast number of interconnected pore throats which form channels within the subterranean formation thereby allowing flows of oil and/or gas to the wellbore. The ease of hydrocarbon extraction is dependent upon characteristics of the subterranean formation such as resistivity flow and capillary pressure, both of which are highly dependent upon the number, size, and distribution of unblocked pore throats within the subterranean formation. A common problem encountered during typical oil and/or gas extraction, is the decrease of productivity resulting from the blockage of pore throats by: 1) water, commonly referred to as "water block"; and/or 2) condensed hydrocarbons, commonly referred to as "condensate block".

Water block occurs in oil and gas wells when pore throats are blocked by an accumulation of water which may be result of filtrate water from drilling mud, cross flow of water from water-bearing zones, water from completion or workover operations, water from hydraulic fracturing, and water from emulsions. Condensate block occurs in gas wells when pore throats are blocked by an accumulation of liquid hydrocarbons which may be the result of oil-based drilling mud, hydrocarbon liquids used in workover operations, and the use of oil-based fracturing fluids.

Additionally, the pressure during the extraction of gas often drops below the dew point pressure of the gas causing the gas to condense into liquid hydrocarbons also resulting in condensate block. Water blocks and condensate blocks may occur together or independently, leading to a decrease in well productivity and, in certain instances, to complete halt in production.

One method for the prevention or remediation of water blocks and/or condensate blocks involves modifying the wettability of the rock within the subterranean formation wherein the rock is contacted by a wettability modifier such that the rock's wetability is modified from an initially oil or water wet state to an intermediate or gas wet state. Proposed wettability modifiers include non-polymeric and fluorinated polymers, both of which are disclosed by Panga et al., in U.S. Patent Application with Pub. No. 2007/0029085.

Unfortunately, previously disclosed non-polymeric surfactants are disadvantageous for use as wettability modifiers because they suffer from low durability and tend to be easily washed away, therefore requiring repeated treatments. Previously disclosed fluorinated polymers are also disadvantageous for use as wettability modifiers because: 1) they have a high average molecular weight, typically about 140,000 g/mol or above; and 2) they have perfluoro alkyl moieties which are $C_8$ or longer. This combination of high molecular weight and long perfluoro alkyl moieties translates to a high fluorine content and higher costs.

It would be desirable to discover a fluorinated polymer which can act as a wettability modifier without the aforementioned disadvantages.

BRIEF SUMMARY OF THE INVENTION

The present invention provides a fluorinated copolymer which can act as a wettability modifier for the prevention and remediation of water block and condensate block in oil and/or gas producing subterranean formations without the disadvantages of previously disclosed fluorinated polymers. In particular, the invention provides a fluorinated copolymer having an average molecular weight from about 5,000 gram/mol to 50,000 gram/mol, preferably less than about 20,000 g/mol, more preferably less than about 10,000 g/mol, and even more preferably less than 2,000 g/mol. Furthermore, the invention provides a fluorinated copolymer having perfluoro alkyl moieties which are no longer than $C_6$. This combination of low molecular weight and shorter perfluoro alkyl moieties translates to a lower fluorine content and lower costs for use as wettability modifiers for the prevention and remediation of water block and condensate block in oil and/or gas producing subterranean formations.

The present invention comprises a method for preventing or removing water block and/or condensate block in a subterranean formation penetrated by a well bore comprising the step of contacting the formation with an aqueous composition comprising a fluorinated copolymer copolymerized from monomers comprising (preferably consisting of):

(a) from about 30 wt % to about 90 wt % of at least one monomer of formula I:

$$R_f\text{-Q-A-C(O)—C(R)}=CH_2 \qquad\qquad I$$

wherein $R_f$ is a straight or branched-chain perfluoroalkyl group of from 2 to 6 carbon atoms, R is H or $CH_3$, A is O, S or N(R'), wherein R' is H or an alkyl of from 1 to about 4 carbon atoms, Q is alkylene of 1 to about 15 carbon atoms, hydroxyalkylene of 3 to about 15 carbon atoms, —$(C_nH_{2n})(OC_qH_{2q})_m$—, —$SO_2$—$NR'(C_nH_{2n})$—, or —$CONR'(C_nH_{2n})$—, wherein R' is H or an alkyl of from 1 to about 4 carbon atoms, n is 1 to about 15, q is 2 to about 4, and m is 1 to about 15;

(b) from about 10 wt. % to about 70 wt. % of at least one monomer or a mixture of monomers is selected from formula IIA, formula IIB, and formula IIC:

$$(R_1)_2N\text{—}(CH_2)_r\text{—}Z\text{—}C(O)\text{—}C(R_2)=CH_2 \qquad\qquad IIA$$

$$(O)(R_3)(R_4)N\text{—}(CH_2)_r\text{—}Z\text{—}C(O)\text{—}C(R_2)=CH_2 \qquad\qquad IIB$$

$$X^-(R_5)(R_4)(R_3)N^+\text{—}(CH_2)_r\text{—}Z\text{—}C(O)\text{—}C(R_2)=CH_2 \qquad\qquad IIC$$

wherein

Z is —O— or —NR₅—; R₁ is an alkyl group of from 1 to about 3 carbon atoms; R₂ is H or an alkyl radical of 1 to about 4 carbon atoms; R₃ and R₄ are each independently an alkyl of 1 to 4 carbon atoms, hydroxyethyl, benzyl, or R₃ and R₄ together with the nitrogen atom form a morpholine, pyrrolidine, or piperadine ring; R₅ is H or an alkyl of 1 to 4 carbon atoms, or R₃, R₄ and R₅ together with the nitrogen atom form a pyridine ring; r is 2 to 4; provided that for formula IIA the nitrogen is from about 40% to 100% salinized; and (c) from 0 wt % to about 7 wt % of a monomer of the formula III, IV, V or VI or a mixture thereof:

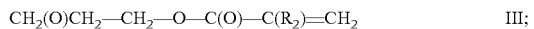

CH₂(O)CH₂—CH₂—O—C(O)—C(R₂)=CH₂   III;

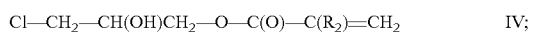

Cl—CH₂—CH(OH)CH₂—O—C(O)—C(R₂)=CH₂   IV;

(R₆)OC(O)C(R₆)=CH₂   V;

or

CH₂=CCl₂   VI wherein each R₂ is independently H or an alkyl radical of 1 to about 4 carbon atoms, and each R₆ is independently H or an alkyl of 1 to about 8 carbon atoms.

Preferably, the fluorinated copolymer of the present invention has an average molecular weight less than about 10,000 g/mol, more preferably less than about 5,000 g/mol, and most preferably less than about 2,000 g/mol.

Preferably, the fluorinated copolymer of the present invention is copolymerized from a monomer of formula I which is represented by $CF_3CF_2(CF_2)_xC_2H_4OC(O)—C(H)=CH_2$ wherein x=0, 2, and 4.

Preferably, the fluorinated copolymer of the present invention incorporates a monomer selected from formula IIA wherein the monomer selected is 2-methyl, 2-(diethylamino) ethyl ester.

Preferably, the fluorinated copolymer of the present invention monomer selected from formula V wherein the monomer selected is 2-propenoic acid.

DETAILED DESCRIPTION OF THE INVENTION

Herein, trademarks are shown in upper case.

The term "(meth)acrylate", as used herein, indicates either acrylate or methacrylate.

Another advantage of using fluorinated copolymer of the present invention as a wettability modifier for the prevention and remediation of water block and condensate block in oil and/or gas producing subterranean formations is that the fluorinated copolymer's hydrophilic and oleophobic properties can be varied over a wide range for different applications and for different subterranean formations by simply varying the relative amounts of monomers (a) of formula I and (b) of formula IIA and/or IIB, while still maintaining its properties as an effective water repellent and liquid hydrocarbon (oil) repellent.

Preferably monomer (b) of formula IIA is derived from diethylaminoethyl methacrylate by partial or full salinization. The free amine portions of the resulting copolymer is then reacted with a salinizing agent such as acetic acid, resulting in the conversion of part or all of the amine moieties to the corresponding acetate. It must be at least about 40% salinized for adequate solubilizing effect, but may be as high as 100%. Preferably the degree of salinization is between about 50% and about 100%. Alternatively, the salinization reaction is carried out on the amine group before the polymerization reaction with equally good results. The salinizing group is an acetate, halide, sulfate, tartarate or other known salinizing group.

The proportion of monomer (b) of formula IIA, IIB, IIC or a mixture thereof must be at least about 10% for adequate solubilization. While a copolymer with proportions of this monomer (b) above about 70%, such a proportion will produce polymers with very high viscosity, making processing and handling difficult. Preferably the proportion of monomer (b) of formula IIA, IIB, IIC or a mixture thereof in the copolymer is between about 15% and about 45% by weight for the best balance of hydrophilicity, oleophobicity and viscosity in currently envisioned applications. Other proportions may be more desirable for other applications. All weight percentages are based on the monomer weight as quaternized.

They are prepared by reacting the aforesaid acrylate or methacrylate ester or corresponding acrylamide or methacrylamide with conventional oxidizing agents such as hydrogen peroxide or peracetic acid.

The quaternary ammonium monomers of formula IIC are prepared by reacting the acrylate or methacrylate esters or corresponding acrylamide or methacrylamide with a di-(lower alkyl)sulfate, a lower alkyl halide, trimethylphosphate or triethylphosophate. Dimethyl sulfate and diethyl sulfate are preferred quaternizing agents.

The presence of monomer (c) of formula III, IV, V, or VI is optional, depending on the particular application for the copolymer. While not wishing to be bound by this theory, it is believed that monomer (c) of formula III and IV acts as a reactive site for the polymer to covalently bond to the substrate surface. The monomers of formula III, IV, V and VI are prepared by conventional methods known in the art.

The polymerization of comonomers (a), (b) and (c) is carried out in a solvent such as acetone, methylisobutyl ketone, ethyl acetate, isopropanol, and other ketones, esters and alcohols. The polymerization is conveniently initiated by azo initiators such as 2,2'-azobis(2,4-dimethylvaleronitrile). These initiators are sold by E. I. du Pont de Nemours and Company, Wilmington, Del., commercially under the name of VAZO 67, 52 and 64, and by Wako Pure Industries, Ltd., Richmond, Va., under the name "V-501."

EXAMPLES

Examples are carried out using the Berea cores from Cleveland Quarries (Amherst, Ohio) and reservoir sandstone cores from the subsurface from the Middle East. The Berea and reservoir core have the same diameter D of about 2.5 cm, while the length L of Berea is about 15 cm and the length L of reservoir core is about 10 cm. The permeability of Berea is in a range of 600 mD to 1000 mD. While the permeability of reservoir core is about 2 to about 6 mD. The porosity $\phi$ describes the fraction of void space defined by the ratio:

$$\phi = V_p/V, \qquad (1)$$

where $V_p$ is the volume of void-space and V is the total or bulk volume of the porous material, including the solid and void space. The porosity of Berea (0.21-0.22) is about twice that of the reservoir core (0.11-0.13).

The unit of "PV" (pore volume) is defined as the void volume of a single core. The porosity can be alternatively expressed based the bulk density $\rho$ and particle density $\rho_p$:

$$\phi = 1 - \rho/\rho_p. \qquad (2)$$

Table 1 shows the relevant data of the cores used in this work. The sandstone particle density calculated from Eq. (2) is about 2.44 g/cm³ for Berea and about 2.61 g/cm³ for reservoir core respectively. Prior to the experiments, the cores are cleaned by rinse and injection of water, followed by drying in the oven.

TABLE 1

Relevant data of the cores

| Core type | Designation | D [cm] | L [cm] | W [g] | φ |
|---|---|---|---|---|---|
| Berea | BYR | 2.58 | 15.1 | 163.93 | 0.224 |
|  | B1 | 2.58 | 15.1 | 153.56 | 0.220 |
|  | B2 | 2.52 | 14.9 | 151.69 | 0.205 |
|  | B3 | 2.52 | 14.8 | 149.49 | 0.205 |
|  | B4 | 2.42 | 14.5 | 134.53 | 0.224 |
|  | B5 | 2.41 | 14.7 | 133.90 | 0.224 |
|  | B6 | 2.39 | 14.7 | 131.89 | 0.224 |
|  | B7 | 2.45 | 14.6 | 138.27 | 0.224 |
|  | B8 | 2.43 | 14.6 | 135.35 | 0.224 |
|  | B9 | 2.43 | 14.4 | 133.95 | 0.224 |
|  | B10 | 2.43 | 14.3 | 128.88 | 0.224 |
|  | B11 | 2.43 | 14.1 | 131.14 | 0.214 |
|  | B12 | 2.42 | 12.8 | 118.95 | 0.217 |
|  | B13 | 2.44 | 14.2 | 132.09 | 0.217 |
|  | B14 | 2.45 | 14.4 | 136.94 | 0.222 |
|  | B15 | 2.45 | 14.6 | 138.27 | 0.225 |
|  | B16 | 2.45 | 14.1 | 134.35 | 0.221 |
|  | B17 | 2.45 | 14.7 | 139.87 | 0.224 |
|  | B18 | 2.45 | 14.1 | 134.90 | 0.222 |
|  | B20 | 2.44 | 14.04 | 132.52 | 0.223 |
|  | B21 | 2.44 | 14.26 | 133.79 | 0.224 |
|  | B22 | 2.46 | 14.26 | 136.95 | 0.217 |
|  | B23 | 2.48 | 14.67 | 144.18 | 0.209 |
|  | B24 | 2.46 | 13.10 | 128.53 | 0.208 |
|  | B25 | 2.46 | 13.70 | 134.10 | 0.208 |
|  | B18 | 2.45 | 14.1 | 134.90 | 0.222 |
| Reservoir | R1 | 2.48 | 9.72 | 105.50 | 0.131 |
|  | R2 | 2.48 | 9.75 | 106.04 | 0.134 |
|  | R3 | 2.48 | 10.48 | 118.52 | 0.111 |
|  | R4 | 2.48 | 10.44 | 118.56 | 0.105 |
|  | R5 | 2.48 | 10.45 | 117.16 | 0.109 |

The treatments are carried out by injecting chemical solution into cores and aging at high temperature and high pressure. The wettability modification of cores is evaluated by measurement of contact angle and imbibition test. The liquid mobility is examined by the flow in two-phase state. By the term "imbibition" as used herein is meant a process in which a wetting phase displaces a non-wetting phase in a porous medium.

Mobility in a core is examined via single-phase gas flow, and two-phase liquid displacing the gas phase. The flow parameters of porous media with respect to different fluids are calculated. Applying the Forchheimer equation in the steady-state gas flow:

$$\frac{M_g(p_1^2 - p_2^2)}{2\mu_g ZRTLj_g} = \beta \frac{j_g}{\mu_g} + \frac{1}{k_g}, \quad (3)$$

where $p_1$ and $p_2$ are the inlet and outlet pressure; $M_g$, $\mu_g$, and $j_g$ are molecular weight, viscosity, and mass flux of the gas, respectively; R and Z are the gas constant and the gas deviation factor; T is temperature and L is the core length. The absolute permeability, $k_g$, and high velocity-coefficient, $\beta$, are determined from the intercept and slope in the plot of $M_g(p_1^2-p_2^2)/(2\mu_g ZRTLj_g)$ vs. $j_g/\mu_g$.

The absolute permeability and high-velocity coefficient are measured. In the unsteady-state gas-liquid flow with gas displaced by liquid injection, the effective and relative permeability of liquid is calculated at the final steady state using the Darcy expression to the quasi steady-state:

$$\Delta p = Q \frac{\mu_l}{k_{el}} \frac{L}{A}, \quad (4)$$

to describe the pressure drop, $\Delta p$, as a function of the volume flow rate, Q, with the parameters of liquid viscosity, $\mu_l$, core length, L, cross section area, A, and the effective liquid permeability, $k_{el}$. It is the so-called 'effective' because the core is not 100% saturated with liquid even the pressure drop has reached steady state. The effectiveness of the wettability modification from the change of fluid flow parameters after chemical treatment is measured.

The liquid relative permeability $k_{rl}$ is calculated by the ratio of the liquid effective permeability to the absolute permeability obtained from single-phase gas flow:

$$k_{rl} = \frac{k_{el}}{k_g}, \quad (5)$$

Examples are carried out using the Berea cores (B1-B18) from Cleveland Quarries (Amherst, Ohio) and reservoir sandstone cores from the subsurface from the Middle East. Prior to the tests, the cores are cleaned by rinse and injection of water or normal decane, followed by drying in the oven. Air is the gas phase in contact angle measurement and imbibition tests. The model liquid is either water or normal decane (oil). The water is either pure water or brine (1.0 wt % NaCl dissolved in tap water).

2-propenoic acid, 2-methyl-3,3,4,4,5,5,6,6,7,7,8,8,8-tridecafluorooctyl ester (CAS 2144-53-8), 2-propenoic acid, 2-methyl-, 2-(diethylamino)ethyl ester, acetate (CAS 2397-53-7), and 2,2'-azobis(2-methylbutyronitrile) (CAS 13472-08-7) are available from E. I. du Pont de Nemours and Company, Wilmington, Del. Other reagents are commercially available, For example, from Aldrich Chemical Co., Milwaukee, Wis.

Method 1 Chemical Treatment

The wettability of the core was modified by chemical treatment at 140° C. and $1.5 \times 10^6$ Pa (200 psig). The chemical solution of 5 PV is injected in the nitrogen-saturated core, followed by aging overnight of about 15 h. About 20 PV of pure water was then injected to displace the chemical solution and wash the core. The injection of chemical solution or washing water was carried out at a flow rate of 4 cm$^3$/min in Berea. Then, nitrogen (~30 PV) was injected to drain the liquids from the core at $\Delta p$ about $6.9 \times 10^4$ Pa (10 psia) for Berea. The purpose of water washing was to have an indication of durability of chemical treatment at high temperature through the examination of the contact angle.

Method 2 Permanency of Treatment

The reaction between rocks and chemicals was studied by analyzing liquid streams before they enter the rock and after contact with the rock. Qualitative analyses were made by color change in the cores and the solutions. The chemical adsorption was measured from the gain in the core weight after treatment. The pH of chemical solutions was measured by the pH meter (OAKTON, Model pHTestr 30). The automatic temperature compensation was built into the pH meter. Through its temperature sensor, the measurement error caused by the change in the electrode sensitivity due to alterations in the temperature was compensated to give the actual pH reading of the sample. The surface potential of the glass electrode exhibited non-linear behavior vs. the concentration of H+ or OH− ions in the acid and alkali regions. Three professional pH buffer solutions at pH=4, 7, 10 (Fisher Scientific), covering the pH range of the experimental solutions, were used to calibrate the pH meter. The reproducibility of the pH measurements for the aqueous solution was about 0.02 units. However due to the low dissociation of H+ ion in the IPA solution, the pH reading of chemical in IPA solutions had fluctuations (errors) of about 0.5. The refractive index, density and viscosity of chemical solutions were measured by refractometer (Abbe C-10, accuracy=0.0003), pycometer (Moore-Van Slyke specific-gravity bottle, 2 mL), and viscometer (Ubbelohde capillary, size OB), respectively.

The composition of chemical solutions was analyzed using gas chromatography-mass spectrometry (GCMS) and inductively coupled plasma-mass spectrometry (ICPMS).

Method 3. Contact Angle Measurements

A pipette was used to place a liquid drop on the surface of the air-saturated core at room temperature of about 20° C. The configuration of a sessile liquid drop on the core surface in the ambient air was magnified on a monitor screen. Snapshots of the drop image were taken by a digital camera under the proper illumination of light source. The air-liquid-rock three-phase-contact angle was measured through the liquid phase using the goniometry tool of the software Image Pro Analyzer. In Berea, the liquid drop of water or N-decane (oil) imbibed instantly into the liquid-wetting untreated core, indicating a contact angle of 0°. As the rock wettability was modified by chemical treatment to liquid-non-wetting (gas-wetting), the water contact angle, $\theta_w$, increased to 120°-135° and N-decane ($nC_{10}$) contact angle, $\theta_o$, increased to 45°-80°.

Method 4 Spontaneous Imbibition Test

Spontaneous liquid imbibition into the air-saturated cores was monitored at room temperature of about 20° C. It was performed by immersing the air-saturated core in the liquid while hanging under an electronic balance. The dynamic process of liquid imbibitions into the core was studied by recording the core weight gain with time. The liquid saturation was calculated as the ratio of the amount of liquid imbibed into the core to the core pore volume:

$$S_w = \frac{\Delta W_l / \rho_l}{V_p}, \quad (6)$$

where $\Delta W_l$ is the weight gain due to liquid imbibition and $\rho_l$ is the liquid density. The effect of wettability modification was evaluated by comparing the liquid saturation vs. time before and after treatment. The imbibition rate decreased as the wettability is modified from liquid-wetting to non-wetting.

Method 5 Fluid Flow Test

Fluid flow tests were conducted to evaluate the effect of wettability modification. FIG. 3 shows the setup. An overburden pressure of $6.9 \times 10^6$ Pa (1000 psig) was applied by the syringe pump (ISCO, D series) on the core inside the core holder (Temco, type HCH). The temperature of the system was maintained by a universal oven (Memmert). Gas was injected from the compressed nitrogen cylinder or liquid injection from the inlet pump. The inlet pressure and pressure drop were measured by the pressure transducers (Validyne Engineering), with the accuracy of ~1.4 kPa (0.2 psia) after calibration by the deadweight tester (Ametek). A backup pressure regulator was used to adjust the pressure drop while measuring the gas flow rate by a flow meter in the range of 1-80 cm³/sec with the accuracy of about 0.5%. The liquid flow rate was fixed using the inlet pump while maintaining the outlet pressure by the receiver pump.

In single-phase gas flow, the inlet and outlet pressures at various gas flow rates were recorded at the steady state. In the two-phase flow when liquid displaced gas, the liquid was injected at a fixed flow rate into the gas-saturated core. The transient pressure drop was recorded until the steady state was reached.

Example 1

Preparation of Compound A

A 1 L reactor fitted with a stirrer, thermometer and reflux condenser was charged with: 2-propenoic acid, 2-methyl-3,3,4,4,5,5,6,6,7,7,8,8,8-tridecafluorooctyl ester (128.0 g), 2-propenoic acid, 2-methyl-,2-(diethylamino) ethyl ester (67.4 g), dodecyl mercaptan (2.4 g), 2,2'-azobis(2-methylbutyronitrile) (VAZO-67, 0.98 g) and 4-methyl-2-pentanone (MIBK, 132.0 g). The charged reactor was then purged with nitrogen for 30 minutes at 30° C. The temperature of the reactor was then raised to 70° C. and allowed to react with stirring for 16 hours. After 16 hours of reaction time, a 3% acetic acid in water solution (40 g) at 50° C. was slowly added. The MIBK within the reaction mixture was then removed via distillation under atmospheric pressure to give the final product in water which was standardized to 30.0% solids (9.3% F content). The number average molecular weight ($M_n$) of the polymer (relative to polystyrene standards) as determined by gel permeation chromatography was 7,000 Da with a polydispersity (PDI) of 1.5. In this example a low molecular fluoropolymer was achieved because the polymerization process was interrupted by the addition of dodecyl mercaptan.

Example 2

Preparation of Compound C

The same procedure described above for the preparation of Compound A was employed, but using of fluoromonomer (a) having the formula:

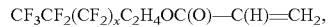

$CF_3CF_2(CF_2)_xC_2H_4OC(O)-C(H)=CH_2,$ wherein x=0, 2, 4, and 6, with the change in the distribution of fluoromonomer (a). A copolymer solution of perfluoroalkylethyl methacrylate, having a weight average molecular weight of approximate $10^4$ gram/mol, was obtained, which was designated as Compound C and was used in the following tests.

Example 3

Preparation of Compound D

Compound D is a fluorinated polydimethylsiloxane fluid, which WACKER 65000 VP grafted with 1-perfluorohexyl-ethylene-2-sulfonylchloride: 50 gram WACKER 65000 VP, which is available from Wacker Chemie AG, Munich, Germany, reacted with 25 gram of 1-perfluorohexyl-ethylene-2-sulfonylchloride in 80 gram methyl isobutyl ketone (MIBK), at 14° C. A solution of fluorinated polydimethylsiloxane, having a weight average molecular weight of approximate $10^3$ gram/mol, was obtained. Compound D was used in the following tests.

Example 4

Preparation of Compound E

Compound E is a blend of 5% active ingredient of Compound A prepared above and 0.25% active ingredient of ZONYL FS-610, a fluorinated telomer based phosphate ammonium salt in isopropanol, which is available from E. I. du Pont de Nemours and Co., Wilmington, Del. Compound E was used in the following tests.

Example 5

Preparation of Compound F

Compound F is a blend of 5% active ingredient of Compound A prepared above and 0.25% active ingredient of ZONYL FS-200, a fluorinated telomer based amine salt in isopropanol, which is available from E. I. du Pont de Nemours and Co., Wilmington, Del. Compound F was used in the following tests.

Comparative Example 1

Preparation of Comparative Compound A

ZONYL 8740, a polysubstituted methacrylic copolymer, having a weight average molecular weight of approximate $10^5$ gram/mol, which is available from E. I. du Pont de Nemours and Co., Wilmington, Del., was used as the Comparative Compound A in the flowing tests.

Comparative Example 2

Preparation of Comparative Compound B

ZONYL 8867L, a polysubstituted methacrylic copolymer, having a weight average molecular weight of approximate $10^5$ gram/mol, which is available from E. I. du Pont de Nemours and Co., Wilmington, Del., was used as the Comparative Compound B in the flowing tests.

Preparation of Aqueous Compositions

The fluoropolymers in Examples 1-5 and Comparative Examples 1-2 were dissolved in isopropanol to a dilution of about 1% wt to about 5% wt. The 1% wt aqueous solutions of Compound A, Compound C, Compound D, Compound E, Compound F, and Comparative Compound.

Contact Angle

FIG. 9. Contact angle of water and $nC_{10}$ on Berea (A) before and (B) after treatment with Compound E solution (1.05 wt % polymer), and on Berea (C) before and (D) after treatment with Compound F solution (1.05 wt % polymer).

The effect of wettability modification was evaluated by measuring the gas-liquid-rock contact angle before and after treatment according to the Method 3. Contact angle data at the core inlet before and after treatment with Compound A-D and Comparative Compound A are shown in Table 2. As the table shows, there seems to be an effect of concentration on the increase of the contact angle. The experimental error of the measured contact angle was about ~5°. The increase of water contact angle was 120°-150° from treatment in Berea; but the increase for the reservoir core is only 25°-65°. The $nC_{10}$ contact angle increase was from 0°-80° for the treated Berea and from 27°-45° for the reservoir core. The treatment with Compound C (2 wt %) and Compound A (1 wt %-5 wt %) increases contact angle the most for water and $nC_{10}$ in Berea, respectively.

Contact angle data at the core inlet before and after treatment with Compound E-F are shown in Table 3. As the table shows, there seems to be an effect of concentration on the increase of the contact angle. The experimental error of the measured contact angle was ~5°. The increase of water contact angle was 120°-135° from treatment in Berea. The $nC_{10}$ contact angle increase was 45°-80° for the treated Berea. The contact angle for water was uniform across the core while for $nC_{10}$; the contact angle change was limited to the inlet of the treated core. The treatment with Compound E solution of 3.15 wt % polymer resulted in a higher contact angle measurement for $nC_{10}$ in Berea, than Compound F. The Compound E-F induced contact angle increase in the treated Berea cores for water and $nC_{10}$, similar to the Compound A, C-D reported in Table 6.

TABLE 2

Contact angle data at 23° C.

| | | | | | | Contact angle of water and $nC_{10}$ | | | | |
| --- | --- | --- | --- | --- | --- | --- | --- | --- | --- | --- |
| Core | | Chemical | | | | Before treatment | | After treatment | | Change |
| Type | Designation | Sample Name | Designation | Conc. [wt %] | | $\theta_w$ [°] | $\theta_o$ [°] | $\theta_w$ [°] | $\theta_o$ [°] | $\Delta\theta_w$ [°] | $\Delta\theta_o$ [°] |
| Berea | B11 | | Comparative | 0.25 | 0 | 0 | 135 | 0 | +135 | 0 |
| | B4 | | Compound A | 1 | 0 | 0 | 120 | 0 | +120 | 0 |
| | B10 | | | | 0 | 0 | 130 | 0 | +130 | 0 |
| | B12 | | | | 0 | 0 | 135 | 0 | +135 | 0 |
| | BYR | | | 2 | 0 | 0 | 135 | 0 | +135 | 0 |
| | B2 | | | | 0 | 0 | 135 | 30 | +135 | +30 |
| | B6 | | | | 0 | 0 | 135 | 0 | +135 | 0 |
| | B9 | | | 3 | 0 | 0 | 135 | 45 | +135 | +45 |
| | B16 | | Compound C | 1 | 0 | 0 | 135 | 55 | +135 | +55 |
| | B7 | | | 2 | 0 | 0 | 150 | 50 | +150 | +50 |
| | B13 | | Compound D | 1 | 0 | 0 | 135 | 0 | +135 | 0 |
| | B14 | | Compound A | 1 | 0 | 0 | 140 | 80 | +140 | +80 |
| | B17 | | | 3 | 0 | 0 | 140 | 80 | +140 | +80 |
| | B18 | | | 5 | 0 | 0 | 140 | 80 | +140 | +80 |
| Reservoir | R1 | | Comparative | 1 | 70 | 0 | 110 | 40 | +40 | +40 |
| | R3 | | Compound A | | 110 | 5 | 135 | 45 | +25 | +40 |
| | R2 | | | 2 | 70 | 0 | 135 | 45 | +65 | +45 |
| | R4 | | Compound A | 1 | 80 | 3 | 135 | 30 | +55 | +27 |
| | R5 | | | 3 | 70 | 3 | 135 | 40 | +65 | +37 |

TABLE 3

Contact angle data (~20° C.)

| | | | | | Contact angle of water and $nC_{10}$ | | | | | |
|---|---|---|---|---|---|---|---|---|---|---|
| | Chemical solution | | | | Before treatment | | After treatment | | Change | |
| | | Polymer | | | | | | | | |
| Core | Sample Name | Solvent | Conc. [wt %] | Chemical adsorption | $\theta_w$ [°] | $\theta_o$ [°] | $\theta_w$ [°] | $\theta_o$ [°] | $\Delta\theta_w$ [°] | $\Delta\theta_o$ [°] |
| B25 | IPA | IPA | 0.00 | N/A | 0 | 0 | 120 | 0 | 120 | 0 |
| B22 | Compound E | | 1.05 | 0.63 | 0 | 0 | 135 | 60 | 135 | 60 |
| B24 | | | 3.15 | 2.02 | 0 | 0 | 135 | 80 | 135 | 80 |
| B23 | Compound F | | 1.05 | 1.08 | 0 | 0 | 135 | 70 | 135 | 70 |

Imbibition

The results of imbibitions for various new chemicals in Table 4. The final water saturation in spontaneous imbibitions decreases by 81% to 93% by treatment with both TLF chemicals. The chemical treatment (with polymer concentration<3.15 wt %) has little effect on oil imbibition (the imbibition change<6%).

ally, the permeability reduction increased and high-velocity coefficient decreased with increasing chemical concentration. In Table 5, the treatment for Berea with Compound A (1 wt %-5 wt %) seemed to have a negligible effect on permeability. A permeability reduction of 10% and a high-velocity coefficient increased by factor of two would have a negligible

TABLE 4

Imbibition data (~20° C.)

| | | | | | Final saturation of water and $nC_{10}$ | | | | | |
|---|---|---|---|---|---|---|---|---|---|---|
| | Chemical solution | | | | Before treatment | | After treatment | | Change | |
| | | Polymer | | | | | | | | |
| Core | Sample Name | Solvent | Conc. [wt %] | Chemical adsorption | $S_w$ [%] | $S_o$ [%] | $S_w$ [%] | $S_o$ [%] | $\Delta S_w/S_w$ [%] | $\Delta S_o/S_o$ [%] |
| B25 | IPA | IPA | 0.00 | N/A | 63 | 67 | 48 | 70 | 25 | 5 |
| B20 | Comparative Compound A | IPA | 0.33 | N/A | 57 | 65 | 50 | 69 | 12 | 6 |
| B22 | Compound E | IPA | 1.05 | 0.63 | 60 | 66 | 11 | 70 | 81 | 5 |
| B24 | | | 3.15 | 2.02 | 62 | 66 | 4 | 64 | 93 | 3 |
| B23 | Compound F | IPA | 1.05 | 1.08 | 59 | 65 | 8 | 68 | 86 | 4 |

Permeability

The absolute permeability and high-velocity coefficient before and after treatment were measured according to Method 5. The dependence of pressure drop on gas flow rate is studied using the Forchheimer expression from Eq. (4) at 140° C. The pressure drop, $\Delta p = p_1 - p_2$, and the average pressure, $\bar{p} = (p_1 + p_2)/2$ across the core were $\bar{p}$ about $3.9 \times 10^5$ Pa and $\Delta p$ about $1.6 \times 10^5$ Pa for Berea, and $\bar{p}$ about $4.7 \times 10^5$ Pa and $\Delta p$ about $7.1 \times 10^5$ Pa for the reservoir core. The measurements of absolute permeability and high-velocity coefficient before and after treatment were presented in Table 5 and Table 6. There was a reduction of absolute permeability, and an increase in high-velocity coefficient from treatment. Genereffect in two phase performance. Among all the chemicals, Compound D had the best performance in single-phase gas flow.

In Table 6, the permeability reduction increases and high-velocity coefficient decrease with increasing Compound E concentration. The treatment for Berea with Compound E with 1.05 wt % polymer seemed to have a negligible effect on permeability. A permeability reduction below 10% and a high-velocity coefficient increase by factor of two will have a negligible effect in two-phase performance. Between Compound E and Compound F, Compound E with the least permeability reduction performed the best in single-phase gas flow, and is comparable to the best one of Compound A.

TABLE 5

Absolute gas permeability and high-velocity coefficient data at 140° C.

| Core | | Chemical | | | Absolute permeability and high-velocity coefficient | | | | | |
|---|---|---|---|---|---|---|---|---|---|---|
| | | | | | Before treatment | | After treatment | | Change | |
| Type | Designation | Sample Name | Designation | Conc. [wt %] | $k_g$ [mD] | $\beta$ [$10^6$ cm$^{-1}$] | $k_g$ [mD] | $\beta$ [$10^6$ cm$^{-1}$] | $\Delta k_g/k_g$ (%) | $\Delta\beta/\beta$ (%) |
| Berea | B11 | Comparative | | 0.25 | 747 | 0.10 | 681 | 0.42 | 9 | 319 |
| | B10 | Compound A | | 1 | 957 | 0.33 | 811 | 0.78 | 15 | 136 |

TABLE 5-continued

Absolute gas permeability and high-velocity coefficient data at 140° C.

| Core | | | | Absolute permeability and high-velocity coefficient | | | | | |
|---|---|---|---|---|---|---|---|---|---|
| | | | | Before treatment | | After treatment | | Change | |
| Type | Desig-nation | Sample Name | Chemical Desig-nation | Conc. [wt %] | $k_g$ [mD] | $\beta$ [$10^6$ cm$^{-1}$] | $k_g$ [mD] | $\beta$ [$10^6$ cm$^{-1}$] | $\Delta k_g/k_g$ (%) | $\Delta\beta/\beta$ (%) |
| | B6 | | | 2 | 911 | 0.26 | 723 | 0.49 | 21 | 86 |
| | B9 | | | 3 | 984 | 0.27 | 722 | 0.57 | 27 | 11 |
| | B16 | | Compound C | 1 | 843 | 0.27 | 765 | 0.26 | 9 | 4 |
| | B7 | | | 2 | 875 | 0.25 | 681 | 0.42 | 22 | 69 |
| | B13 | | Compound D | 1 | 677 | 0.29 | 651 | 0.31 | 4 | 7 |
| | B14 | | Compound A | 1 | 708 | 0.28 | 682 | 0.32 | 4 | 14 |
| | B17 | | | 3 | 693 | 0.33 | 677 | 0.42 | 2 | 26 |
| | B18 | | | 5 | 721 | 0.31 | 702 | 0.48 | 3 | 53 |
| Reser-voir | R1 | | Comparative | 1 | 4.82 | 253 | 4.71 | 708 | 2 | 180 |
| | R3 | | Compound A | | 2.36 | 3605 | 2.20 | 8746 | 7 | 143 |
| | R4 | | Compound A | 1 | 2.50 | 2415 | 2.46 | 3334 | 1 | 38 |
| | R5 | | | 3 | 2.23 | 3440 | 2.06 | 2966 | 7.5 | 14 |

TABLE 6

Absolute gas permeability and high-velocity coefficient data (140° C.)

| | Chemical solution | | | Absolute permeability and high-velocity coefficient | | | | | |
|---|---|---|---|---|---|---|---|---|---|
| | | | Polymer | Before treatment | | After treatment | | Change | |
| Core | Sample Name | Solvent | Conc. [wt %] | $k_g$ [mD] | $\beta$ [$10^6$ cm$^{-1}$] | $k_g$ [mD] | $\beta$ [$10^6$ cm$^{-1}$] | $\Delta k_g/k_g$ (%) | $\Delta\beta/\beta$ (%) |
| B25 | IPA | | 0.00 | 667 | 0.23 | 570 | 0.28 | 14 | 23 |
| B22 | Compound E | IPA | 1.05 | 687 | 0.22 | 698 | 0.23 | 2 | 4 |
| B24 | Compound F | IPA | 3.15 | 640 | 0.18 | 598 | 0.31 | 6 | 79 |
| B23 | | | 1.05 | 614 | 0.14 | 550 | 0.18 | 10 | 23 |

FIG. 15. Pressure drop vs. pore volume before and after treatment with chemicals: Berea, 140° C. (A) Compound E and Compound F (B) Compound A, E, F and Comparative compound A.

Two-phase flow testing by water displacement of gas was performed. Water was injected into the nitrogen-saturated cores at a fixed flow rate of 6 cm$^3$/min for Berea at 140° C. and the outlet pressure of $1.5\times10^6$ Pa (200 psig). The pressure drop across the untreated and treated core was monitored with time.

The effective and relative permeability were calculated from steady-state pressure drop using the Darcy law. The results are shown in Table 7 and Table 8. The chemical treatment decreased the pressure drop, and increased the effective and relative permeability for both the Berea and reservoir cores. The treatment effectiveness was evaluated by calculating the changes in the effective permeability and relative permeability. Both $\Delta k_{ew}/k_{ew}$ and $\Delta k_{rw}/k_{rw}$ decreased with increasing Comparative Compound A concentration, but Compound A had an optimum concentration at 3 wt %. Among all the chemicals, Compound D had the best performance in increasing the water effective permeability in Berea, followed by Compound A. Compound D was the only chemical containing siloxane, which was perhaps contributing to its superior performance to repel water. However for the reservoir core, Comparative Compound A was more effective than Compound A. Between Compound E and Compound F, Compound E (1.05 wt % polymer) with the largest $\Delta k_{ew}/k_{ew}$ and $\Delta k_{rw}/k_{rw}$ performed the best in water injection test. All the results for $k_{rw}$ in Table 7 and Table 8 provided a strong indication that the chemical treatment changed the core surface from hydrophilic to hydrophobic resulting in an increase in water mobility.

TABLE 7

Effective water permeability and relative permeability data at 140° C.

| Core | | Chemical | | | Effective and relative permeability | | | | | |
|---|---|---|---|---|---|---|---|---|---|---|
| | | | | | Before treatment | | After treatment | | Change | |
| Type | Desig-nation | Sample Name | Desig-nation | Conc. [wt %] | $k_{ew}$ [mD] | $k_{rw}$ | $k_{ew}$ [mD] | $k_{rw}$ | $\Delta k_{ew}/k_{ew}$ (%) | $\Delta k_{rw}/k_{rw}$ (%) |
| Berea | B10 | | Comparative | 1 | 197 | 0.21 | 393 | 0.48 | 100 | 136 |
| | B6 | | Compound A | 2 | 223 | 0.24 | 334 | 0.46 | 50 | 89 |

TABLE 7-continued

Effective water permeability and relative permeability data at 140° C.

| Core | | Chemical | | Effective and relative permeability | | | | | |
|---|---|---|---|---|---|---|---|---|---|
| | | | | Before treatment | | After treatment | | Change | |
| Type | Desig- nation | Sample Name | Desig- nation | Conc. [wt %] | $k_{ew}$ [mD] | $k_{rw}$ | $k_{ew}$ [mD] | $k_{rw}$ | $\Delta k_{ew}/k_{ew}$ (%) | $\Delta k_{rw}/k_{rw}$ (%) |
| | B9 | | | 3 | 261 | 0.27 | 365 | 0.51 | 40 | 90 |
| | B16 | | Compound C | 1 | 214 | 0.25 | 415 | 0.54 | 94 | 114 |
| | B7 | | | 2 | 262 | 0.30 | 366 | 0.54 | 40 | 80 |
| | B13 | | Compound D | 1 | 152 | 0.22 | 376 | 0.58 | 147 | 157 |
| | B14 | | Compound A | 1 | 176 | 0.25 | 379 | 0.56 | 116 | 124 |
| | B17 | | | 3 | 153 | 0.22 | 415 | 0.61 | 142 | 148 |
| | B18 | | | 5 | 219 | 0.30 | 390 | 0.56 | 78 | 82 |
| Reser- voir | R1 | | Comparative | 1 | 1.33 | 0.28 | 2.00 | 0.42 | 50 | 53 |
| | R3 | | Compound A | | 0.77 | 0.32 | 0.91 | 0.41 | 19 | 28 |
| | R4 | | Compound A | 1 | 0.96 | 0.38 | 1.01 | 0.41 | 5 | 6 |
| | R5 | | | 3 | 0.93 | 0.42 | 1.09 | 0.53 | 17 | 27 |

TABLE 8

Effective water permeability and relative permeability data (140° C.)

| | Chemical solution | | | Effective and relative water permeability | | | | | |
|---|---|---|---|---|---|---|---|---|---|
| | | | | Before treatment | | After treatment | | Change | |
| Core | Sample Name | Solvent | Polymer Conc. [wt %] | $k_{ew}$ [mD] | $k_{rw}$ | $k_{ew}$ [mD] | $k_{rw}$ | $\Delta k_{ew}/k_{ew}$ (%) | $\Delta k_{rw}/k_{rw}$ (%) |
| B25 | | IPA | 0.00 | 266 | 0.40 | 320 | 0.56 | 20 | 41 |
| B22 | Compound E | IPA | 1.05 | 252 | 0.37 | 441 | 0.63 | 75 | 72 |
| B24 | | | 3.15 | 259 | 0.41 | 382 | 0.64 | 47 | 57 |
| B23 | Compound F | IPA | 1.05 | 247 | 0.40 | 341 | 0.62 | 38 | 54 |

In summary, the examples demonstrated the wettability modification of various rock samples from liquid-wetting to intermediate gas-wetting by the method of the present invention wherein the rock samples are contacted with a composition comprising a low molecular weight fluorinated copolymer in accordance with the invention. The wettability modification increased the contact angle of liquid drops on the core, and decreased the spontaneous imbibition. The effect of wettability modification on liquid mobility was pronounced in the gas-water system. The adsorption of the fluorochemical onto the core surface has negligible effect on the absolute permeability for the chemicals with small molecular weight.

Thus, while there have been described what are presently believed to be the preferred embodiments of the present invention, those skilled in the art will realize that other and further modifications can be made to the invention without departing from the true spirit of the invention, such further and other modifications are intended to be included herein within the scope of the appended claims.

What is claimed is:

1. A comprising the step of contacting a subterranean formation penetrated by a well bore to prevent or remove water block and/or condensate block with an aqueous composition comprising a fluorinated copolymer copolymerized from monomers comprising:
(a) from about 30 wt % to about 90 wt % of at least one monomer of formula I:

$R_f\text{-Q-A-C(O)—C(R)=CH}_2$  I wherein
$R_f$ is a straight or branched-chain perfluoroalkyl group of from 2 to 6 carbon atoms,
R is H or $CH_3$,
A is O, S or N(R'), wherein R' is H or an alkyl of from 1 to about 4 carbon atoms,
Q is alkylene of 1 to about 15 carbon atoms, hydroxyalkylene of 3 to about 15 carbon atoms, —($C_nH_{2n}$)($OC_qH_{2q}$)$_m$—, —$SO_2$—NR'($C_nH_{2n}$)—, or —CONR'($C_nH_{2n}$)—, wherein R' is H or an alkyl of from 1 to about 4 carbon atoms, n is 1 to about 15, q is 2 to about 4, and m is 1 to about 15;
(b) from about 10 wt % to about 70 wt % of at least one monomer or a mixture of monomers is selected from formula IIA, formula IIB, or formula IIC:

$(R_1)_2\text{N—(CH}_2)_r\text{—Z—C(O)—C(R}_2)\text{=CH}_2$  IIA $(O)(R_3)(R_4)\text{N—(CH}_2)_r\text{—Z—C(O)—C(R}_2)\text{=CH}_2$  IIB $X^-(R_5)(R_4)(R_3)N^+\text{—(CH}_2)_r\text{—Z—C(O)—C(R}_2)\text{=CH}_2$  IIC wherein
Z is —O— or —$NR_5$—; $R_1$ is an alkyl group of from 1 to about 3 carbon atoms; $R_2$ is H or an alkyl radical of 1 to about 4 carbon atoms; $R_3$ and $R_4$ are each independently an alkyl of 1 to 4 carbon atoms, hydroxyethyl, benzyl, or $R_3$ and $R_4$ together with the nitrogen atom form a morpholine, pyrrolidine, or piperadine ring; $R_5$ is H or an alkyl of 1 to 4 carbon atoms, or $R_3$, $R_4$ and $R_5$ together with the nitrogen atom form a pyridine ring; r is 2 to 4; provided that for formula IIA the nitrogen is from about 40% to 100% salinized; and (c) from 0 wt % to about 7 wt % of a monomer of the formula III, IV, V or VI or a mixture thereof:

$$CH_2(O)CH_2—CH_2—O—C(O)—C(R_2)\!=\!CH_2 \quad\quad III;$$

$$Cl—CH_2—CH(OH)CH_2—O—C(O)—C(R_2)\!=\!CH_2 \quad\quad IV;$$

$$(R_6)OC(O)C(R_6)\!=\!CH_2 \quad\quad V;$$

or $$CH_2\!=\!CCl_2 \quad\quad VI$$

wherein
each $R_2$ is independently H or an alkyl radical of 1 to about 4 carbon atoms, and each $R_6$ is independently H or an alkyl of 1 to about 8 carbon atoms,
wherein fluorinated copolymer has an average molecular weight less than about 20,000g/mol, and wherein any perfluoroaliky moieties present in the fluorinated copolymer are no larger than 6 carbon atoms long.

2. The method of claim 1 wherein the fluorinated copolymer has an average molecular weight less than about 10,000 g/mol.

3. The method of claim 1 wherein the monomer of formula I is represented by $CF_3CF_2(CF_2)_xC_2H_4OC(O)—C(H)\!=\!CH_2$ wherein x=0, 2, and 4.

4. The method of claim 1 wherein the fluorinated copolymer incorporates a monomer selected from formula IIA wherein the monomer selected is 2-methyl-, 2-(diethylamino)ethyl ester.

5. The method of claim 1 wherein the fluorinated copolymer incorporates a monomer selected from formula V wherein the monomer selected is 2-propenoic acid.

6. The method of claim 1 wherein the fluorinated copolymer is copolymerized from monomers consisting of:

(a) from about 30 wt % to about 90 wt % of at least one monomer of formula I:

$$R_f\text{-}Q\text{-}A\text{-}C(O)—C(R)\!=\!CH_2 \quad\quad I$$

wherein
$R_f$ is a straight or branched-chain perfluoroalkyl group of from 2 to 6 carbon atoms,
R is H or $CH_3$,
A is O, S or N(R'), wherein R' is H or an alkyl of from 1 to about 4 carbon atoms,
Q is alkylene of 1 to about 15 carbon atoms, hydroxyalkylene of 3 to about 15 carbon atoms, $—(C_nH_{2n})(OC_qH_{2q})_m—$, $—SO_2—NR'(C_nH_{2n})—$, or $—CONR'(C_nH_{2n})—$, wherein R' is H or an alkyl of from 1 to about 4 carbon atoms, n is 1 to about 15, q is 2 to about 4, and m is 1 to about 15;

(b) from about 10 wt % to about 70 wt % of at least one monomer or a mixture of monomers selected from formula IIA, formula IIB, or formula IIC:

$$(R_1)_2N—(CH_2)_r—Z—C(O)—C(R_2)\!=\!CH_2 \quad\quad IIA$$

$$(O)(R_3)(R_4)N—(CH_2)_r—Z—C(O)—C(R_2)\!=\!CH_2 \quad\quad IIB$$

$$X^-(R_5)(R_4)(R_3)N^+—(CH_2)_r—Z—C(O)—C(R_2)\!=\!CH_2 \quad\quad IIC$$

wherein
Z is $—O—$ or $—NR_5—$; $R_1$ is an alkyl group of from 1 to about 3 carbon atoms; $R_2$ is H or an alkyl radical of 1 to about 4 carbon atoms; $R_3$ and $R_4$ are each independently an alkyl of 1 to 4 carbon atoms, hydroxyethyl, benzyl, or $R_3$ and $R_4$ together with the nitrogen atom form a morpholine, pyrrolidine, or piperadine ring; $R_5$ is H or an alkyl of 1 to 4 carbon atoms, or $R_3$, $R_4$ and $R_5$ together with the nitrogen atom form a pyridine ring; r is 2 to 4; provided that for formula IIA the nitrogen is from about 40% to 100% salinized; and (c) from 0 wt % to about 7 wt % of a monomer of the formula III, IV, V or VI or a mixture thereof:

$$CH_2(O)CH_2—CH_2—O—C(O)—C(R_2)\!=\!CH_2 \quad\quad III;$$

$$Cl—CH_2—CH(OH)CH_2—O—C(O)—C(R_2)\!=\!CH_2 \quad\quad IV;$$

$$(R_6)OC(O)C(R_6)\!=\!CH_2 \quad\quad V;$$

or $$CH_2\!=\!CCl_2 \quad\quad VI$$

wherein
each $R_2$ is independently H or an alkyl radical of 1 to about 4 carbon atoms, and each $R_6$ is independently H or an alkyl of 1 to about 8 carbon atoms.

7. The method of claim 6 wherein fluorinated copolymer has an average molecular weight less than about 10,000 g/mol.

8. The method of claim 6 wherein:

(a) the monomer of formula I is represented by $CF_3CF_2(CF_2)_xC_2H_4OC(O)—C(H)\!=\!CH_2$ wherein x=0, 2, and 4;

(b) the fluorinated copolymer incorporates a monomer selected from formula IIA wherein the monomer selected is 2-methyl-, 2-(diethylamino)ethyl ester; and (c) the fluorinated copolymer incorporates a monomer selected from formula V wherein the monomer selected is 2-propenoic acid.

9. The method of claim 1, wherein the monomers of the fluorinated copolymer are copolymerized in the presence of dodecyl mercaptan.

10. A method for preventing or removing water block and/or condensate block in a subterranean formation penetrated by a well bore comprising the step of contacting the formation with an aqueous composition comprising a fluorinated copolymer copolymerized from monomers comprising:

(a) from about 30 wt % to about 90 wt % of at least one monomer of formula I:

$$R_f\text{-}Q\text{-}A\text{-}C(O)—C(R)\!=\!CH_2 \quad\quad I$$

wherein
$R_f$ is a straight or branched-chain perfluoroalkyl group of from 2 to 6 carbon atoms,
R is H or $CH_3$,
A is O, S or N(R'), wherein R' is H or an alkyl of from 1 to about 4 carbon atoms,
Q is alkylene of 1 to about 15 carbon atoms, hydroxyalkylene of 3 to about 15 carbon atoms, $—(C_nH_{2n})(OC_qH_{2q})_m—$, $—SO_26—NR'(C_nH_{2n})—$, or $—CONR'(C_nH_{2n})—$, wherein R' is H or an alkyl of from 1 to about 4 carbon atoms, n is 1 to about 15, q is 2 to about 4, and m is 1 to about 15;

(b) from about 10 wt % to about 70 wt % of at least one monomer or a mixture of monomers is selected from formula IIA, formula IIB, or formula IIC:

$$(R_1)_2N—(CH_2)_r—Z—C(O)—C(R_2)\!=\!CH_2 \quad\quad IIA$$

$$(O)(R_3)(R_4)N—(CH_2)_r—Z—C(O)—C(R_2)\!=\!CH_2 \quad\quad IIB$$

$$X^-(R_5)(R_4)(R_3)N^+—(CH_2)_r—Z—C(O)—C(R_2)\!=\!CH_2 \quad\quad IIC$$

wherein

Z is —O— or —$NR_5$—; $R_1$ is an alkyl group of from 1 to about 3 carbon atoms; $R_2$ is H or an alkyl radical of 1 to about 4 carbon atoms; $R_3$ and $R_4$ are each independently an alkyl of 1 to 4 carbon atoms, hydroxyethyl, benzyl, or $R_3$ and $R_4$ together with the nitrogen atom form a morpholine, pyrrolidine, or piperadine ring; $R_5$ is H or an alkyl of 1 to 4 carbon atoms, or $R_3$, $R_4$ and $R_5$ together with the nitrogen atom form a pyridine ring; r is 2 to 4; provided that for formula IIA the nitrogen is from about 40% to 100% salinized; and (c) from 0 wt % to about 7 wt % of a monomer of the formula III, IV, V or VI or a mixture thereof:

$$CH_2(O)CH_2—CH_2—O—C(O)—C(R_2)=CH_2 \qquad III;$$

$$Cl—CH_2—CH(OH)CH_2—O—C(O)—C(R_2)=CH_2 \qquad IV;$$

$$(R_6)OC(O)C(R_6)=CH_2 \qquad V;$$

or $$CH_2=CCl_2 \qquad VI$$

wherein each $R_2$ is independently H or an alkyl radical of 1 to about 4 carbon atoms, and each $R_6$ is independently H or an alkyl of 1 to about 8 carbon atoms, wherein the fluorinated copolymer has an average molecular weight less than about 50,000 g/mol, and wherein any perfluoroalky moieties present in the fluorinated copolymer are no larger than 6 carbon atoms long.

* * * * *